United States Patent

Acker et al.

Patent Number: 5,918,902
Date of Patent: Jul. 6, 1999

[54] GAS BAG

[75] Inventors: Dominque Acker, Alfdorf; Thomas Richter, Schwäbisch Gmünd, both of Germany

[73] Assignee: TRW Occupant Restraint Systems GmbH, Alfdorf, Germany

[21] Appl. No.: 08/831,629

[22] Filed: Apr. 9, 1997

[30] Foreign Application Priority Data

Apr. 12, 1996 [DE] Germany ............. 296 06 709 U

[51] Int. Cl.⁶ .................................. B60R 21/26
[52] U.S. Cl. .................... 280/743.1; 280/742
[58] Field of Search ................. 280/736, 740, 280/742, 743.1, 743.2

[56] References Cited

U.S. PATENT DOCUMENTS

| | | | |
|---|---|---|---|
| 4,830,401 | 5/1989 | Honda | 280/736 |
| 5,160,164 | 11/1992 | Fischer et al. | 280/743.2 |
| 5,172,933 | 12/1992 | Strasser | 280/740 |
| 5,573,270 | 11/1996 | Sogi et al. | 280/740 |
| 5,577,765 | 11/1996 | Takeda et al. | 280/743.1 |

FOREIGN PATENT DOCUMENTS

| | | |
|---|---|---|
| 0600598 | 6/1994 | European Pat. Off. . |
| 0698533 | 2/1996 | European Pat. Off. . |
| 4442118 | 6/1995 | Germany . |
| 296 06 724 U | 2/1997 | Germany . |
| 07149199 | 6/1995 | Japan . |
| 07267032 | 10/1995 | Japan . |
| 07329667 | 12/1995 | Japan . |
| 08011659 | 1/1996 | Japan . |

OTHER PUBLICATIONS

XP 000581300 Gas Diffuser and Attachment for Passenger Air Bag Module, 2244 Research Disclosure (1996) Mar., No. 383,Emsworth, GB.

Primary Examiner—Kenneth R. Rice
Attorney, Agent, or Firm—Tarolli, Sundheim, Covell, Tummino & Szabo

[57] ABSTRACT

A gas bag is provided, which has an inflation opening and a fabric part. The gas bag comprises a wall with an interior surface defining the interior of the gas bag. The fabric part is arranged in the interior of the gas bag opposite to the inflation opening. The fabric part, together with a part of the interior surface of the gas bag, defining a flow duct for compressed gas entering the gas bag through the inflation opening.

2 Claims, 2 Drawing Sheets

GAS BAG

TECHNICAL FIELD

The invention relates to a gas bag as is employed for a vehicle occupant restraining system.

BACKGROUND OF THE INVENTION

A restraining system for vehicle occupants comprises as its main parts a device which after activation provides compressed gas, and a gas bag which, starting from a folded neutral or resting state, may be deployed in an accident by the compressed gas in order to provide a restraining action for a vehicle occupant.

BRIEF SUMMARY OF THE INVENTION

The invention provides a gas bag having an inflation opening and a fabric part. The gas bag comprises a wall with an interior surface defining the interior of the gas bag. The fabric part is arranged in the interior of the gas bag opposite to the inflation opening. The fabric part, together with a part of the interior surface of the gas bag, defining a flow duct for compressed gas entering the gas bag through the inflation opening. By means of such a flow duct the deployment of the gas bag may be adapted in various different ways to the actual requirements to be met, while at the same time hot compressed gas is prevented from directly impinging on the wall of the gas bag and from damaging same.

Further advantageous developments of the invention are defined in the dependent claims.

BRIEF DESCRIPTION OF THE DRAWINGS

The invention will now be described with reference to a preferred embodiment which is illustrated in the drawings.

DETAILED DESCRIPTION OF THE INVENTION

Figure 1:
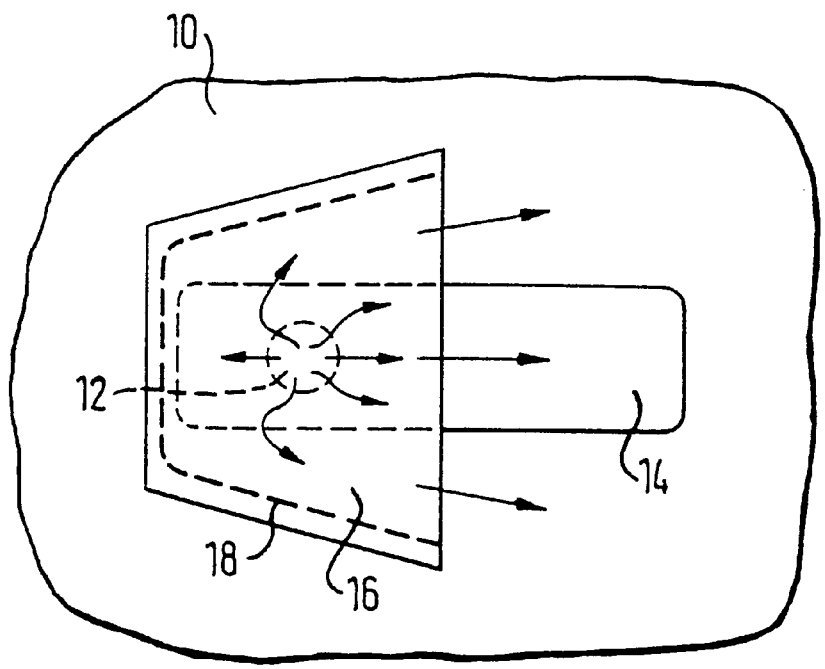
FIG. 1 diagrammatically shows a plan view of a part of a gas bag in accordance with a preferred embodiment of the invention.
Figure 2:
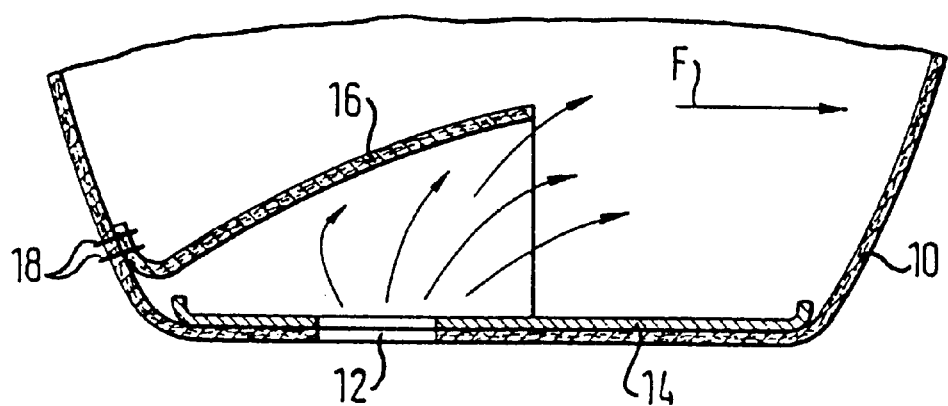
FIG. 2 diagrammatically shows a cross section taken through the part of the gas bag illustrated in FIG. 1.
Figure 3:
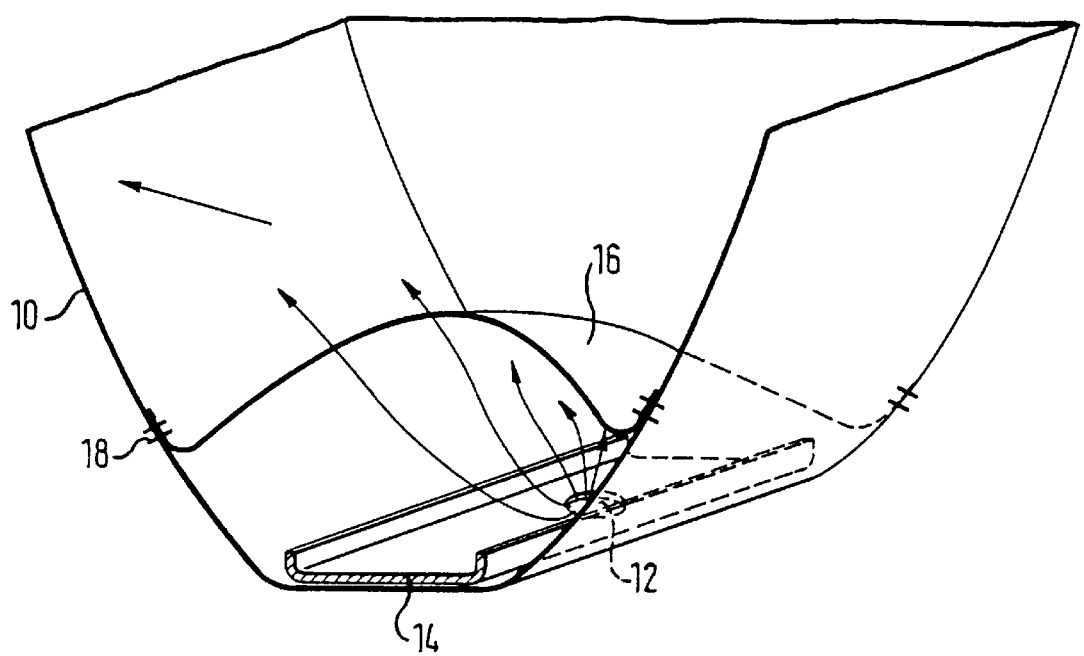
FIG. 3 diagrammatically shows a perspective view of the part of the gas bag depicted in FIG. 1.

In FIGS. 1 through 3 the reader will diagrammatically see a partial view of a gas bag according to a preferred embodiment of the invention. The gas bag 10 is provided with an inflation opening 12 and furthermore with a holding plate 14 arranged in the interior of the gas bag, said plate surrounding the inflation opening 12. The holding plate 14 may be employed for the purpose of attachment of the gas bag 10 on a means (not illustrated) which in case of need supplies compressed gas. By means of the compressed gas, the gas bag 10 can be deployed starting from a resting state (not illustrated) in which the gas bag is folded up. In the deployed state, the gas bag 10 may provide a protective action for a vehicle passenger. Such a means for the supply of compressed gas may be a gas generator or a compressed gas storage means.

In the interior of the gas bag 10 a fabric part 16 is arranged which is opposite to the inflation opening 12 and is attached to the wall of the gas bag 10 in a manner as to form, together with a part of the interior surface of the gas bag 10, a flow duct for the compressed gas which may flow into the gas bag 10 through the inflation opening 12. In the illustrated embodiment, the fabric part 16 has four corners, and it is attached to the wall of the gas bag 10 by seams 18 at three of its longitudinal sides. In accordance with a variant, not illustrated, the fabric part 16 could be placed behind the holding plate 14.

Owing to the arrangement of the seams 18, the fabric part 16 together with the wall of the gas bag 10 and the holding plate 14 constitutes a pocket defining a flow duct widening toward the interior space of the gas bag (see more particularly FIG. 2). The compressed gas entering the gas bag 10 through the inflation opening 12 is deflected in this flow duct, the particular arrangement of the fabric part 16 providing for a direction of inward flow of the compressed gas, as indicated by the arrow F, into the interior of the gas bag 10, this contributing to controlled deployment of the gas bag 10.

The inflation opening 12 and furthermore the fabric part 16 are arranged eccentrically with respect to the middle of the holding plate 14, the flow duct being open on that side of the holding plate 16 which, with respect to the middle of the holding plate 16, is opposite to the inflation opening 12. Together with the deflection action by the flow duct on the compressed gas entering into the interior of the gas bag 10, this eccentric arrangement of the inflation opening 12 ensures that the wall of the gas bag 10 is protected against direct contact with the hot and aggressive compressed gas entering the interior of the gas bag 10.

The fabric part 16 is manufactured of a fabric as is also employed for the gas bag 10 itself. Dependent on the particular application, the fabric part may be single-ply or multiple-ply. The fabric part 16 does not hinder folding up the gas bag 10, since it may be folded up in a space saving manner.

The invention consequently provides a gas bag which is simple to produce and in the case of which the deployment operation may be affected in any desired manner by a suitable design of the fabric part 16. The fabric part 16 additionally protects the wall of the gas bag 10 against direct contact with the hot compressed gas which flows into the interior of the gas bag when same is activated.

We claim:

1. A gas bag provided with an inflation opening and a fabric part, said gas bag having a wall with an interior surface defining the interior of said gas bag, said fabric part being arranged in said interior of said gas bag opposite to said inflation opening, said fabric part, together with a part of said interior surface of said gas bag, defining a flow duct for compressed gas entering said gas bag through said inflation opening, a holding plate being arranged in said interior of said gas bag and surrounding said inflation opening, said inflation opening and said fabric part being arranged eccentrically with respect to a middle of said holding plate, said flow duct being open toward a side of said holding plate which, with respect to said middle of said holding plate, is opposite to said inflation opening.

2. The gas bag of claim 1, wherein said fabric part is fitted behind said holding plate.

* * * * *